United States Patent [19]

Kosaka et al.

[11] 4,088,450
[45] May 9, 1978

[54] HYDROGEN GENERATOR

[75] Inventors: Katuaki Kosaka, Hidaka; Zene Ueno, Fuchu; Seizo Ishikura; Atushi Chida, both of Sayama, all of Japan

[73] Assignee: Nissan Motor Company, Limited, Yokohama, Japan

[21] Appl. No.: 721,047

[22] Filed: Sep. 7, 1976

[30] Foreign Application Priority Data

Sep. 8, 1975 Japan .................................. 50-108041

[51] Int. Cl.² ............................ B01J 8/02; C01B 1/13
[52] U.S. Cl. ..................................... 23/288 L; 23/281;
23/288 R; 23/288 F; 48/197 R; 123/1 A;
123/3; 123/DIG. 12; 423/648 R; 252/373
[58] Field of Search ............ 23/288 R, 288 F, 288 H,
23/288 J, 288 K, 288 L, 281 (U.S. only); 123/3
(U.S. only), DIG. 12, 1 A, 3; 423/651 (U.S.
only)–656 (U.S. only), 648 R (U.S. only);
48/61, 197 R (U.S. only); 252/373 (U.S. only)

[56] References Cited

U.S. PATENT DOCUMENTS

| 1,452,145 | 4/1923 | Cederberg | 23/288 R |
|---|---|---|---|
| 1,919,626 | 7/1933 | Finn, Jr. | 23/288 R |
| 2,071,119 | 2/1937 | Harger | 23/288 F |
| 2,397,899 | 4/1946 | Witkiewicz | 423/651 X |
| 2,533,945 | 12/1950 | Legatski | 423/651 X |
| 3,198,727 | 8/1965 | Lifland | 23/288 R X |
| 3,377,138 | 4/1968 | Gutmann et al. | 423/651 |
| 3,720,625 | 3/1973 | Kapp et al. | 423/656 X |
| 3,962,411 | 6/1976 | Setzer et al. | 423/651 |
| 3,965,253 | 6/1976 | Miller et al. | 423/651 X |
| 3,986,350 | 10/1976 | Schmidt | 123/3 X |

Primary Examiner—Morris O. Wolk
Assistant Examiner—Roger F. Phillips
Attorney, Agent, or Firm—Lowe, King, Price & Markva

[57] ABSTRACT

A plurality of catalysts are arranged in a desirable order based on the temperature gradient existing in the reaction chamber. The operating temperature of the catalyst and the temperature of the portion of the reaction chamber it is in, are matched so as to avoid catalytic degradation and/or catalytic inactivity.

3 Claims, 3 Drawing Figures

HYDROGEN GENERATOR

The present invention relates to a hydrogen generator for producing a hydrogen rich gaseous mixture comprising hydrogen and carbon monoxide by catalytic conversion of alcohol such as methanol or ethanol or aqueous solutions of such alcohols.

Among various measures for producing a hydrogen rich gaseous mixture, a hydrogen generator has been utilized for converting alcohol into a gaseous mixture comprising hydrogen and carbon monoxide by catalytic conversion thereof.

In such a hydrogen generator, alcohol ($C_mH_{2m+1}OH$) such as methanol ($CH_3OH$) can be endothermically decomposed into a hydrogen rich gaseous mixture as shown in the following Equation (1).

$$CH_3OH \rightarrow CO + 2H_2 \qquad (1)$$

Aqueous solutions of methanol can also be converted into a hydrogen rich gaseous mixture. In this instance, the carbon monoxide produced by the decomposition of methanol shown in Equation (1) further reacts with steam to produce hydrogen as shown in the following equation (2).

$$CO + H_2O \rightarrow CO_2 + H_2 \qquad (2)$$

To augment the rate of the above-mentioned decomposition and reaction, the conventional hydrogen generator includes a catalyst-containing reaction chamber containing therein a catalyst and a heating means for elevating the temperature of the catalyst to the operating temperature thereof.

Examples of such catalysts conventionally used in catalytic conversion of methanol are shown as follows.

Catalyst (a): zinc oxide-copper oxide catalyst (operating temperature range 200°–300° C)
Catalyst (b): zinc oxide-chromium oxide catalyst (operating temperature range 300°–400° C)
Catalyst (c): platinum catalyst (operating temperature range 400°–500° C)

As is well known in the art, a catalyst becomes effective when heated up to a particular temperature, viz., an operating temperature, and undergoes deterioration when overheated to a temperature exceeding the operating temperature. Thus, careful examination and selection of a catalyst to be used in the hydrogen generator must be made so that the temperature of the catalyst in a heated condition is within the operating temperature range thereof.

In a conventional hydrogen generator, however, such selection cannot be achieved satisfactorily because the conventional hydrogen generator has a reaction chamber the temperature of which in a heated condition is not uniform, viz., a temperature gradient exists in the reaction chamber.

Further explanation will be made of the temperature gradient existing in the reaction chamber. The conventional hydrogen generator generally includes a heating means having an elongated heating chamber through which heated gases flow in one longitudinal direction from an inlet portion to an outlet portion of the reaction chamber, and a catalyst-containing reaction chamber arranged in parallel with the longitudinal direction of the heating chamber and thermally connected with the same. In this instance, the temperature of the heating chamber generally decreases between the inlet portion and the outlet portion along the longitudinal direction thereof since the temperature of the heated gases gradually falls as the heated gases flow from the inlet portion to the outlet portion while conducting heat thereof to the reaction chamber. In case of heated gases, for example, the temperature of which is about 500° C, being supplied to a hydrogen generator, the reaction chamber may exhibit a temperature gradient of 200°–400° C. If the reaction chamber contains therein such a catalyst having relatively low operating temperature as the foregoing Catalyst (a), a portion of the catalyst located in the upstream section (e.g. 400° C) will deteriorate owing to the excessive heat applied thereto. On the other hand, if the reaction chamber contains therein such a catalyst having a relatively high operating temperature as the foregoing Catalyst (b), a portion of the catalyst located in the downstream section (e.g. 200° C) will remain catalytically inactive owing to the insufficient heat applied thereto.

The temperature gradient in the reaction chamber of the hydrogen generator, therefore, causes the above-mentioned drawbacks of the deterioration of a catalyst and poor conversion efficiency.

It is accordingly an object of the present invention to overcome the foregoing drawbacks derived from the temperature gradient existing in the reaction chamber of the conventional hydrogen generator.

It is an another object of the present invention to provide a hydrogen generator with a compact construction which minimizes the fabrication cost thereof.

It is a still another object of the present invention to provide a known internal combustion engine incorporated with a hydrogen generator of the present invention.

Other objects, features and advantages of the present invention will become apparent from the following description in connection with the accompanying drawing, in which.

Figure 1:
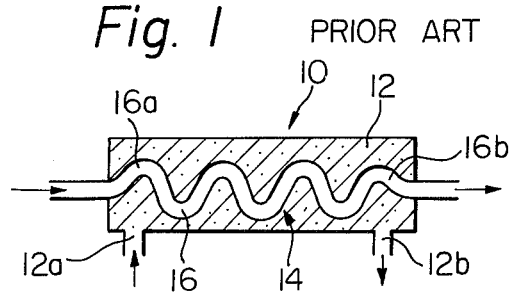
FIG. 1 is a diagramatic sectional view of a prior art hydrogen generator.

Referring now to the drawing, wherein like reference characters designate like or corresponding parts throughout, FIG. 1 shows a conventional hydrogen generator 10 which has been used for converting alcohol such as methanol or aqueous solutions of methanol (hereinafter will be referred to only as methanol for brevity) into a hydrogen rich gaseous mixture comprising hydrogen and carbon monoxide. The conventional hydrogen generator 10 comprises a catalyst-containing reaction chamber 12 containing therein a catalyst and a heating means 14 for elevating the temperature of the reaction chamber 12. The heating means 14 includes a heating chamber 16 communicating with a heated gas producing means (not shown) such, for example, as an exhaust system of an internal combustion engine.

With these arrangements, heated gases are supplied to the heating chamber 16 from the heated gas producing means and flow from an inlet porion 16a of the heating chamber 16 to an outlet portion 16b while transferring heat to the reaction chamber 12 whereby the catalyst in the reaction chamber 12 is heated to the high level. Methanol is charged into the reaction chamber 12 through an inlet 12a thereof and converted into a hydrogen rich gaseous mixture comprising hydrogen and carbon monoxide upon contact with the heated catalyst. The converted hydrogen rich gaseous mixture is conveyed therefrom through an outlet 12b and can be used for various purposes such, for example, as a gaseous fuel for a heat engine such as a gas turbine, a hydrogen fuel for a hydrogen fuel cell, hydrogen gas for a ballon and a reducing gas for reduction operations or reactions.

In this conventional hydrogen generator, as pointed out hereinbefore, the temperature of the heated gases fall as the heated gases flow from the inlet portion 16a to the outlet portion 16b since considerable heat is transferred to the heating chamber 12. Accordingly, the amount of heat exchanged between the heating chamber 16 and the reaction chamber 12 gradually decreases in the direction of the flow of the heated gases whereby a temperature gradient is created in the reaction chamber 12.

In a hydrogen generator having a reaction chamber the temperature gradient of which is so steep as to exceed a predetermined value, the catalyst carried in the reaction chamber 12 inevitably undergoes, at one end, deterioration caused by the excessively high temperatures relative to the operating temperature range thereof and/or a partial inoperativeness, at the other end, caused by the insufficiently high temperatures relative to the operating temperature range thereof. Therefore the conversion and thermal efficiencies of the conventional hydrogen generator are poor.

Figure 2:
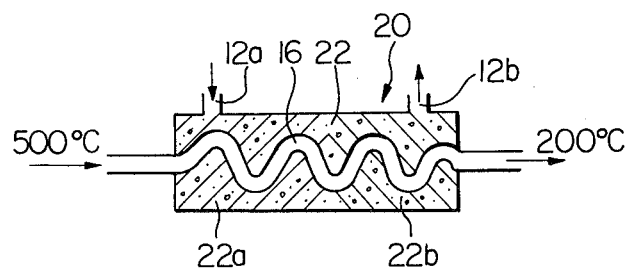
FIG. 2 is a diagramatic sectional view of a hydrogen generator according to the present invention.

FIG. 2 shows a hydrogen generator according to the present invention which has a construction and arrangement substantially similar to the hydrogen generator shown in FIG. 1. The hydrogen generator according to the present invention is distinguished from the conventional hydrogen generator by the reaction chamber which contains therein a plurality of catalysts and which are constructed to arrange the catalysts in a desirable order based on the temperature gradient existing in the reaction chamber.

Referring to the embodiment shown in FIG. 2, the reaction chamber 22 is heated by heated gases such as engine exhaust gases the temperature of which is about 500° C. In this instance, the reaction chamber 22 has a temperature gradient of 200° –400° C.

According to the present invention, the reaction chamber 22 is constructed to separately carry therein at least two catalysts in sections, viz., the upstream section 22a the temperature of which is 300° –400° C and the downstream section 22b the temperature of which is 200° –300° C. The upstream section 22a contains therein the aforementioned Catalyst (b) which is zinc oxide-chromium oxide catalyst, the operating temperature of which is 300° –400° C, and the downstream section 22b contains therein aforementioned Catalyst (a) which is zinc oxide-copper catalyst, the operating temperature of which is 200° –300° C.

It will be understood that the Catalysts (a) and (b) are respectively arranged based on the temperature gradient in the reaction chamber 22 so that the temperature of the Catalysts (a) and (b) in a heated condition are within their respective operating temperature ranges. Therefore the hydrogen generator of the present invention is free from the foregoing drawbacks of the conventional hydrogen generator.

It will be further understood that the hydrogen generator of the present invention can be shaped into a compact construction since it has increased conversion and thermal efficiencies relative to the conventional hydrogen generator.

Although only two catalysts are provided in the hydrogen generator shown in FIG. 2 any number of catalysts may be carried therein within the scope of the present invention. For example, if the reaction chamber has a temperature gradient of 200° –500° C, the foregoing Catalysts (a), (b) and (c) may be respectively carried in the corresponding sections of the reaction chamber.

Figure 3:
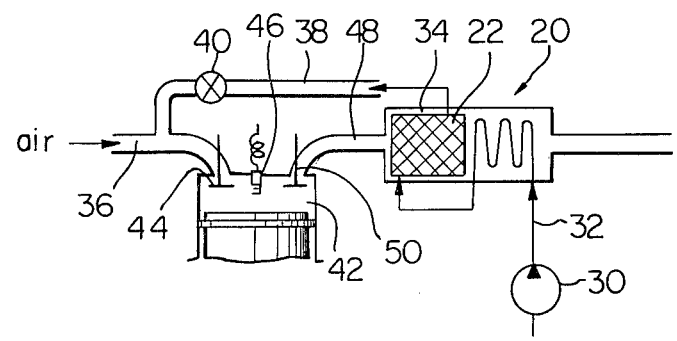
FIG. 3 is a diagramatic view of a known internal combustion engine incorporating the hydrogen generator of the present invention.

FIG. 3 shows a known internal combustion engine incorporating the hydrogen generator according to the present invention for supplying the engine with a hydrogen rich gaseous fuel produced by catalytic conversion of alcohol such as methanol or aqueous solution thereof.

Referring to FIG. 3, a fuel pump 30 communicates with the reaction chamber 22 of the hydrogen generator 20 through a conduit 32 and supplies thereto a methanol fuel from a methanol fuel container (not shown). As shown in the drawing, the conduit 32 includes a waved or coiled portion disposed in the exhaust gas stream, through which the methanol fuel is preheated before being supplied to the reaction chamber 22. The reaction chamber 22 is thermally connected with the heating means 34 which is fluidly connected to an exhaust gas conduit for elevating the temperature thereof. A plurality of catalysts are disposed in the reaction chamber 22 and arranged in a manner as previously mentioned with respect to FIG. 2 for overcoming the aforementioned temperature gradient problem existing in the reaction chamber 22. A methanol fuel charged to the reaction chamber 22 is therefore converted into a hydrogen rich gaseous fuel with increased conversion efficiency. The hydrogen rich gaseous fuel is then conveyed therefrom to an air-intake conduit 36 through a gaseous fuel conveyer 38 and a flow regulator valve 40 for regulating the flow rate of the hydrogen rich gaseous fuel. The hydrogen rich gaseous fuel is then mixed with air in the intake air passage 36 to be supplied to a combustion chamber 42 via an intake valve 44. The mixture of hydrogen rich gaseous fuel and air is compressed to be ignited by an ignition spark plug 46 and consumed in a manner as is well known in the art. Then the exhaust gases are emitted from the combustion chamber 42 to the exhaust gas conduit 48 through an exhaust valve 50.

In this embodiment, it will be understood that the internal combustion engine incorporating the hydrogen generator according to the present invention has a greatly increased thermal efficiency since a larger amount of exhaust gas heat is utilized to produce the hydrogen rich gaseous fuel.

What is claimed is:

1. In a hydrogen generator for producing a hydrogen rich gaseous mixture by endothermic catalytic conversion of alcohol or aqueous solution thereof, including a conduit through which hot gases flow in one longitudinal direction, and a catalyst-containing reaction chamber extending axially along said conduit to be in heat-exchanging relationship therewith, the improvement comprising said reaction chamber having formed therein upstream and downstream sections which are successively arranged with respect to the flow of the heated gases, said upstream section communicating with an inlet through which said alcohol or aqueous solution thereof is supplied to said reaction chamber, said downstream section communicating with an outlet through which converted gaseous mixture is delivered from said reaction chamber, and first and second catalysts having different operating temperature ranges, said first catalyst having a higher operating temperature range than said second catalyst and being disposed in the upstream section, and said second catalyst being disposed in the downstream section thereby providing for optimum conversion as the hot gases give up heat to the endothermic reaction and lower in temperature as they pass through said conduit.

2. In a hydrogen generator used with an internal combustion engine for supplying thereto a hydrogen rich gaseous mixture by endothermic catalytic conversion of alcohol or aqueous solution thereof, including a conduit through which the hot exhaust gases flow in one longitudinal direction, and a catalyst-containing reaction chamber extending axially along said conduit to be in heat-exchanging relationship therewith, the improvement comprising said reaction chamber having formed therein upstream and downstream sections which are successively arranged with respect to the flow of the exhaust gases, said upstream section communicating with an inlet through which said alcohol or aqueous solution is supplied to said reaction chamber, said downstream section communicating with an outlet through which converted gaseous mixture is delivered from said reaction chamber, and first and second catalysts having different operating temperature ranges, said first catalyst having a higher operating temperature range then said second catalyst and being disposed in the upstream section, said second catalyst being disposed in the downstream section, in which said first catalyst is a platinum catalyst and said second catalyst is zinc oxide-chromium oxide catalyst, and in which said inlet is connected to a conduit which communicates with a source of alcohol or aqueous solution thereof and has a waved portion disposed in the exhaust gas stream thereby providing for optimum conversion as the hot gases give up heat to the endothermic reaction and lower in temperature as they pass through said conduit.

3. In a hydrogen generator used with an internal combustion engine for supplying thereto a hydrogen rich gaseous mixture produced by endothermic catalytic conversion of alcohol or aqueous solution thereof, including a conduit through which the hot exhaust gases flow in one longitudinal direction, and a catalyst-containing reaction chamber extending axially along said conduit to be in heat-exchanging relationship therewith, the improvement comprising said reaction chamber having formed therein upstream and downstream sections which are successively arranged with respect to the flow of the exhaust gases, said upstream section communicating with an inlet through which said alcohol or aqueous solution is supplied to said reaction chamber, said downstream section communicating with an outlet through which converted gaseous mixture is delivered from said reaction chamber, and first and second catalysts having different operating temperature ranges, said first catalyst having a higher operating temperature range than said second catalyst and being disposed in the upstream section, said second catalyst being disposed in the downstream section, in which said first catalyst is zinc oxide-chromium oxide catalyst and said second catalyst is zinc oxide-copper oxide catalyst, and in which said inlet is connected to a conduit which communicates with a source of alcohol or aqueous solution thereof and has a waved portion disposed in the exhaust gas stream thereby providing for optimum conversion as the hot gases give up heat to the endothermic reaction and lower in temperature as they pass through said conduit.

* * * * *